(12) United States Patent
Pinkalla et al.

(10) Patent No.: US 9,605,865 B2
(45) Date of Patent: *Mar. 28, 2017

(54) PLIABLE-WALL AIR DUCTS WITH INTERNAL EXPANDING STRUCTURES

(71) Applicant: RITE-HITE HOLDING CORPORATION, Milwaukee, WI (US)

(72) Inventors: Cary Pinkalla, Fox Point, WI (US); Frank Heim, Platteville, WI (US); Kevin J. Gebke, Dubuque, IA (US); Nicholas L. Kaufmann, Sherill, IA (US); William A. Niehaus, Holy Cross, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/288,116

(22) Filed: May 27, 2014

(65) Prior Publication Data

US 2014/0261835 A1     Sep. 18, 2014

Related U.S. Application Data

(63) Continuation of application No. 12/950,511, filed on Nov. 19, 2010, now Pat. No. 8,844,578.

(51) Int. Cl.
*F24F 13/02* (2006.01)
*F16L 11/10* (2006.01)
(Continued)

(52) U.S. Cl.
CPC ............ *F24F 13/0245* (2013.01); *F16L 3/18* (2013.01); *F16L 11/00* (2013.01); *F16L 11/02* (2013.01);
(Continued)

(58) Field of Classification Search
CPC .. F16L 11/02; F16L 11/00; F16L 11/10; F16L 3/18; F16L 55/00; F24F 7/06; F24F 7/065; F24F 13/0218; F24F 13/0254
(Continued)

(56) References Cited

U.S. PATENT DOCUMENTS

| 2,939,378 A | 6/1960 | Zalkind |
| 3,716,077 A | 2/1973 | Sherman et al. |

(Continued)

FOREIGN PATENT DOCUMENTS

| CN | 2162615 Y | 4/1994 |
| DE | 1956659 | 6/1970 |

(Continued)

OTHER PUBLICATIONS

Australian Intellectual Property Office, "Innovation Patent Examination Report No. 1", issued in connection with Australian innovation patent application No. 2014101307, issued on Dec. 23, 2014, 4 pages.

(Continued)

*Primary Examiner* — J. Casimer Jacyna
(74) *Attorney, Agent, or Firm* — Hanley, Flight & Zimmerman, LLC

(57) ABSTRACT

Example air ducts comprising pliable tubular sidewalls are provided with example internal frameworks that hold the duct in a generally expanded shape even when the duct is depressurized. The framework tensions the pliable sidewall material along the length of the ducts to keep the material taut. In some examples, the framework is restrained within the duct such that the duct's sidewall, being in tension, holds the framework in compression longitudinally. Thus, in the longitudinal direction, the duct is in tension and the framework is in compression. To prevent the framework from buckling under the compressive force, some example frame- (Continued)

works comprise a central longitudinal shaft with a plurality of radial spokes and rings that help hold the shaft straight. In some examples, the rings also help hold the duct radially expanded.

12 Claims, 16 Drawing Sheets

(51) Int. Cl.
  *F24F 7/06*    (2006.01)
  *F16L 11/02*    (2006.01)
  *F16L 3/18*    (2006.01)
  *F16L 11/00*    (2006.01)
  *F16L 55/00*    (2006.01)

(52) U.S. Cl.
  CPC .............. *F16L 11/10* (2013.01); *F16L 55/00* (2013.01); *F24F 7/06* (2013.01); *F24F 7/065* (2013.01); *F24F 13/0218* (2013.01); *F24F 13/0254* (2013.01); *F24F 2221/26* (2013.01); *Y10T 29/49826* (2015.01); *Y10T 137/0402* (2015.04)

(58) Field of Classification Search
  USPC ................................ 138/107, 118, 118.1, 119
  See application file for complete search history.

(56) References Cited

U.S. PATENT DOCUMENTS

| | | | |
|---|---|---|---|
| 3,824,909 | A | 7/1974 | Horneff et al. |
| 4,327,775 | A | 5/1982 | Tally |
| 4,456,034 | A | 6/1984 | Bixby |
| 5,096,004 | A | 3/1992 | Ide |
| 5,989,006 | A | 11/1999 | Godeau et al. |
| 6,425,417 | B1 | 7/2002 | Paschke |
| 8,356,634 | B2 | 1/2013 | Blake et al. |
| 8,434,526 | B1 | 5/2013 | Pinkalla et al. |
| 8,844,578 | B2 | 9/2014 | Pinkalla et al. |
| 2007/0220732 | A1 | 9/2007 | Liebson |
| 2009/0194186 | A1 | 8/2009 | Gross |
| 2011/0105239 | A1 | 5/2011 | Garno |
| 2012/0028562 | A1 | 2/2012 | Heim et al. |
| 2012/0125472 | A1 | 5/2012 | Pinkalla et al. |
| 2014/0000744 | A1 | 1/2014 | Pinkalla et al. |
| 2014/0007971 | A1 | 1/2014 | Pinkalla et al. |

FOREIGN PATENT DOCUMENTS

| | | |
|---|---|---|
| EP | 1091179 | 11/2001 |
| FR | 2713317 | 6/1995 |
| GB | 1181405 | 2/1970 |
| JP | H11201537 A | 7/1999 |
| JP | 2004116793 | 4/2004 |
| WO | 2012091795 | 7/2012 |

OTHER PUBLICATIONS

Australian Intellectual Property Office, "Notice of Acceptance", issued in connection with Australian patent application No. 2011353077, issued on Jan. 6, 2015, 2 pages.
Intellectual Property Office of Australia, "Notice of Acceptance", issued in connection with Australian patent application No. 2014277862, issued on Jan. 22, 2015, 2 pages.
State Intellectual Property Office, "First Office Action," issued in connection with Application No. 201180055124.4, Feb. 9, 2015, 14 pages.
Canadian Patent Office, "Second Office action", issued in connection with Canadian patent application No. 2,818,114, mailed on Feb. 16, 2015, 4 pages.
Mexican Patent Office, "Office action", issued in connection with Mexican patent application No. MX/a/2013/005158, mailed on Apr. 21, 2015, 5 pages.
United States Patent and Trademark Office, "Office Action," issued in connection with U.S. Appl. No. 14/018,097, mailed on Jan. 13, 2014, 9 pages.
United States Patent and Trademark Office, "Advisory Action," issued in connection with U.S. Appl. No. 14/018,097, mailed on Apr. 21, 2014, 3 pages.
Patent Cooperation Treaty, "International Preliminary Report on Patentability," issued by the International Searching Authority in connection with PCT/US2011/059199, issued on May 21, 2013, 11 pages.
Patent Cooperation Treaty, "Invitation to Pay Additional Fees and, Where Applicable, Protest Fee," issued by the International Searching Authority in connection with PCT/US2011/059199, issued on Jan. 20, 2012, 8 pages.
United States Patent and Trademark Office, "Final Office Action," issued in connection with U.S. Appl. No. 14/018,097, mailed on Mar. 4, 2014, 8 pages.
Patent Cooperation Treaty, "International Search Report," issued by the International Searching Authority in connection with PCT/US2011/059199, issued on Apr. 11, 2012, 7 pages.
Patent Cooperation Treaty, "Written Opinion of the International Searching Authority," issued by the International Searching Authority in connection with PCT/US2011/059199, issued on Apr. 11, 2012, 10 pages.
United States Patent and Trademark Office, "Office Action," issued in connection with U.S. Appl. No. 12/950,511, mailed on Feb. 20, 2014, 27 pages.
United States Patent and Trademark Office, "Notice of Allowance," issued in connection with U.S. Appl. No. 12/950,511, mailed on May 20, 2014, 21 pages.
European Patent Office, "Communication pursuant to Rules 161(1) and 162 EPC," issued in connection with European Patent Application No. 11788265.4, dated Jun. 26, 2013, 2 pages.
Australian Patent Office, "Certificate of Grant", issued in connection with Australian patent application No. 2011353077, May 7, 2015, 1 page.
Australian Patent Office, "Certificate of Grant", issued in connection with Australian patent application No. 2014277862, May 21, 2015, 1 page.
Australian Intellectual Property Office, "Innovation Patent Certified", issued in connection with Australian Innovation patent No. 2014101307, Jun. 5, 2015, 2 pages.
Qatar Patent Office, "Decision of Amendment", issued in connection with Qatar patent application No. QA/201305/00084, Jul. 9, 2015, 4 pages.
The United States Patent and Trademark Office, "Examiner's Answer", issued in connection with U.S. Appl. No. 14/018,097, mailed on Aug. 22, 2014, 8 pages.
Mexican Patent Office, "Second Office action", issued in connection with Mexican patent application No. MX/a/2013/005158, mailed on Aug. 20, 2015, 7 pages.
Chinese Patent Office, "Second Office action", issued in connection with Chinese patent application No. 201180055124.4, Oct. 23, 2015, 4 pages.
Australian Patent Office, "Patent Examination Report No. 1", issued in connection with Australian patent application No. 2011353077, dated Nov. 7, 2014, 4 pages.
Australian Patent Office, "Certificate of Grant", issued in connection with Australian patent application No. 2014101307, dated Nov. 13, 2014, 1 page.
Canadian Patent Office, "Office Action", issued in connection with Canadian patent application No. 2,818,114, dated Oct. 30, 2014, 3 pages.
The State Intellectual Property Office of People's Republic of China, "Notice of Granting Patent Right", issued in connection with Chinese patent application No. 201180055124.4, Feb. 5, 2016, 4 pages.
State Intellectual Property Office of the People's Republic of China, "Certificate of Invention Patent", issued in connection with Chinese patent application No. 201180055124.4, 1 page.

(56) References Cited

OTHER PUBLICATIONS

Mexican Patent Office, "Third Office action", issued in connection with Mexican patent application No. MX/a/2013/005158, mailed on Feb. 26, 2016, 4 pages.
United States Patent and Trademark Office, "Final Office Action," issued in connection with U.S. Appl. No. 13/879,759 on Sep. 21, 2016, 10 pages.
United States Patent and Trademark Office, "Non-Final Office action", issued in connection with U.S. Appl. No. 13/879,759, mailed on Feb. 1, 2016, 113 pages.
Canadian Patent Office, "Notice of Allowance", issued in connection with Canadian Patent office No. 2,818,114, Dec. 11, 2015, 1 page.
Qatar Patent Office, "Second Office Action", issued in connection with Qatar patent application No. QA 201305/00084, issued Jun. 21, 2016, 6 pages.
Mexican Industrial Property Institute, "Fourth Office Action," issued in connection with Mexican Patent Application No. MX/a/2013/005158, dated Sep. 23, 2016, 7 pages.
European Patent Office, "Communication under Rule 71(3) EPC," issued in connection with European Patent Application No. 11 788 265.4, dated Nov. 11, 2016, 79 pages.
United States Patent and Trademark Office, "Notice of Allowance and Fee(s) Due," issued in connection with U.S. Appl. No. 13/879,759, mailed Dec. 7, 2016, 45 pages.
United States Patent and Trademark Office, "Notice of Allowance and Fee(s) Due," issued in connection with U.S. Appl. No. 14/018,097, dated Jan. 30, 2017, 108 pages.
Canadian Intellectual Property Office, "Office Action," issued in connection with Canadian Patent Application No. 2,931,262, dated Jan. 20, 2017, 3 pages.

PLIABLE-WALL AIR DUCTS WITH INTERNAL EXPANDING STRUCTURES

RELATED APPLICATION

This patent arises from a continuation of U.S. patent application Ser. No. 12/950,511, filed Nov. 19, 2010, which is hereby incorporated herein by reference in its entirety.

FIELD OF THE DISCLOSURE

This patent generally pertains to pliable-wall air ducts and more specifically to internal structures that hold such ducts in a generally open shape even at inactive times when the ducts would otherwise be generally deflated.

BACKGROUND

Ductwork is often used for conveying conditioned air (e.g., heated, cooled, filtered, etc.) discharged from a fan and distributing the air to a room or other areas within a building. Ducts are typically formed of rigid metal, such as steel, aluminum, or stainless steel. In many installations, ducts are hidden above suspended ceilings for convenience and aesthetics. But in warehouses, manufacturing plants and many other buildings, the ducts are suspended from the roof of the building and are thus exposed. In those warehouse or manufacturing environments where prevention of air-borne contamination of the inventory is critical, metal ducts can create problems.

For instance, temperature variations in the building or temperature differentials between the ducts and the air being conveyed can create condensation on both the interior and exterior of the ducts. The presence of condensed moisture on the interior of the duct may form mold or bacteria that the duct then passes onto the room or other areas being supplied with the conditioned air. In the case of exposed ducts, condensation on the exterior of the duct can drip onto the inventory or personnel below. The consequences of the dripping can range anywhere from a minor irritation to a dangerously slippery floor or complete destruction of products underneath the duct (particularly in food-processing facilities).

Further, metal ducts with localized discharge registers have been known to create uncomfortable drafts and unbalanced localized heating or cooling within the building. In many food-processing facilities where the target temperature is 42 degrees Fahrenheit, a cold draft can be especially uncomfortable and perhaps unhealthy.

Many of the above problems associated with metal ducts are overcome by the use of flexible fabric ducts, such as DUCTSOX from DuctSox Corporation of Dubuque, Iowa. Such ducts typically have a pliable fabric wall (often porous) that inflates to a generally cylindrical shape by the pressure of the air being conveyed by the duct. Fabric ducts seem to inhibit the formation of condensation on its exterior wall, possibly due to the fabric having a lower thermal conductivity than that of metal ducts. In addition, the fabric's porosity and/or additional holes distributed along the length of the fabric duct broadly and evenly disperse the air into the room being conditioned or ventilated. The even distribution of airflow also effectively ventilates the walls of the duct itself, thereby further inhibiting the formation of mold and bacteria.

In many cases, however, once the room's conditioning demand has been met, the air supply fan is turned off or down until needed again. When the fan is off, the resulting loss of air pressure in the duct deflates the fabric tube, causing it to sag. Depending on the application and material of the fabric, in some cases, the sagging creates a less than optimal appearance or may interfere with whatever might be directly beneath the duct. Moreover, when the duct is re-inflated, the duct can produce a loud popping sound as the duct's fabric again becomes taut from the air pressure.

DETAILED DESCRIPTION

Figure 1:
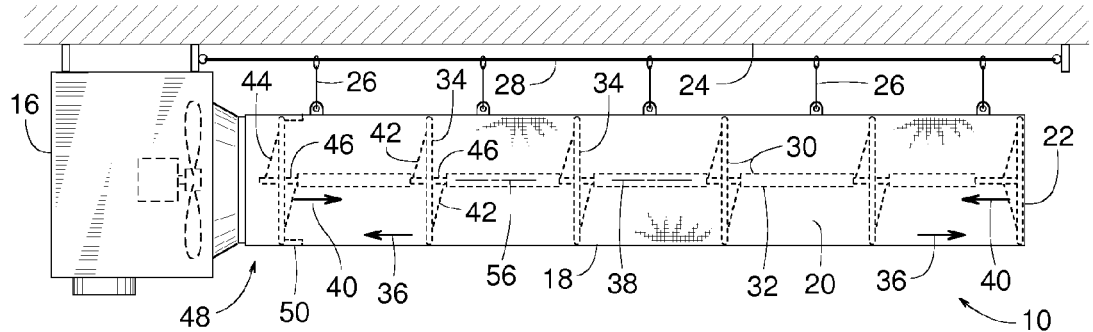
FIG. 1 is a side view of a de-energized example air duct system with an example internal framework for holding the system's pliable duct in a generally expanded shape.
Figure 2:
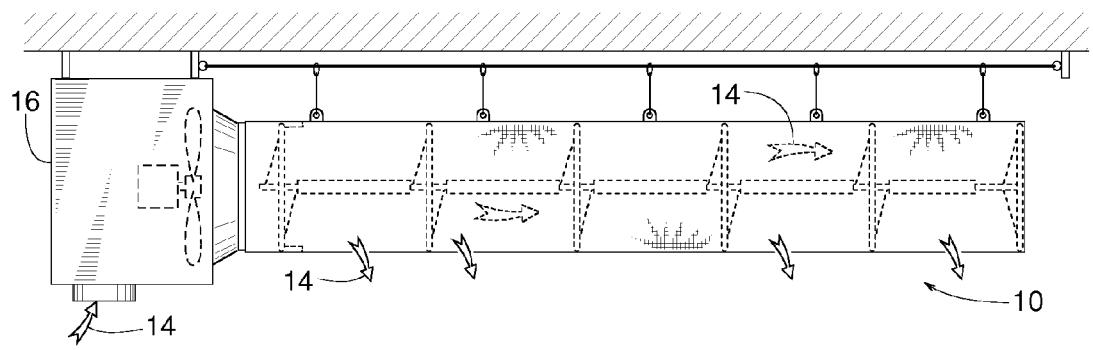
FIG. 2 is a side view similar to FIG. 1 but showing the system's blower energized.

Certain examples are shown in the above-identified figures and described in detail below. In describing these examples, like or identical reference numbers are used to identify same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

FIGS. 1-4 show example air duct systems 10 and 12 for conveying air 14 discharged from a blower 16 and for dispersing or otherwise delivering air 14 to a room or other areas of a building. Duct system 10 of FIGS. 1 and 2 will be explained first, and the differences between duct systems 10 and 12 being explained later.

To convey air 14, duct system 10 includes an air duct 18 comprising a tubular sidewall 20 made of a pliable material. As used herein, the term, "sidewall" will refer to the full circumferential extent of the fabric tube, even if the portion of the sidewall runs along the top or bottom of the tube or anywhere in between. Some examples of pliable sidewall materials include, but are not limited to, a polymer coated or impregnated cloth fabric, an uncoated fabric, a polyester sheet, other polymer or non metallic sheets, and various combinations thereof. To release air 14 from within duct 18 to the room or area it serves, sidewall 20 and/or an end cap 22 of duct 18 includes one or more discharge openings such as, for example, cut-out openings, plastic or metal discharge registers, and/or porosity in the sidewall material itself.

In some examples, duct system 10 is mounted underneath a ceiling 24 with a plurality of hangers 26 suspending duct system 10 from an overhead support structure 28 (e.g. a cable, track, channel, beam, ceiling, etc.). An example framework 30 comprising a shaft 32 and a plurality of ribs 34 installed inside duct 18, and being of a relatively rigid material (e.g., rigid plastic, fiberglass, steel, aluminum, etc.) that is stiffer and less flexible than sidewall 20, holds duct 18 in a generally expanded shape, regardless of whether blower 16 is energized or inactive. Thus, framework 30 helps prevent or minimize the pneumatic shock and resulting popping noise of a pliable air duct being suddenly inflated as blower 16 turns on, which can suddenly increase the air pressure within duct 18 from an inactive ambient air pressure to an active positive air pressure. Framework 30 also eliminates or minimizes the extent to which duct 18 sags or otherwise suffers degradation in appearance when blower 16 is de-energized.

Framework 30 is contained within duct 18 in such a way that framework 30 exerts a tensile force 36 that tensions duct 18 in a generally longitudinal direction 38 so that at least sidewall 20 is maintained at a minimum level of tautness whether blower 16 is activated or not. Tensioning duct 18 lengthwise subjects shaft 32 of framework 30 to a reactive longitudinal compressive force 40. To prevent compressive force 40 from buckling shaft 32 and to help hold duct 18 in a radially expanded shape, ribs 34 are sized to hold duct 18 open and are spaced along the duct's 18 length to limit the radial deflection of shaft 32.

Figure 5:
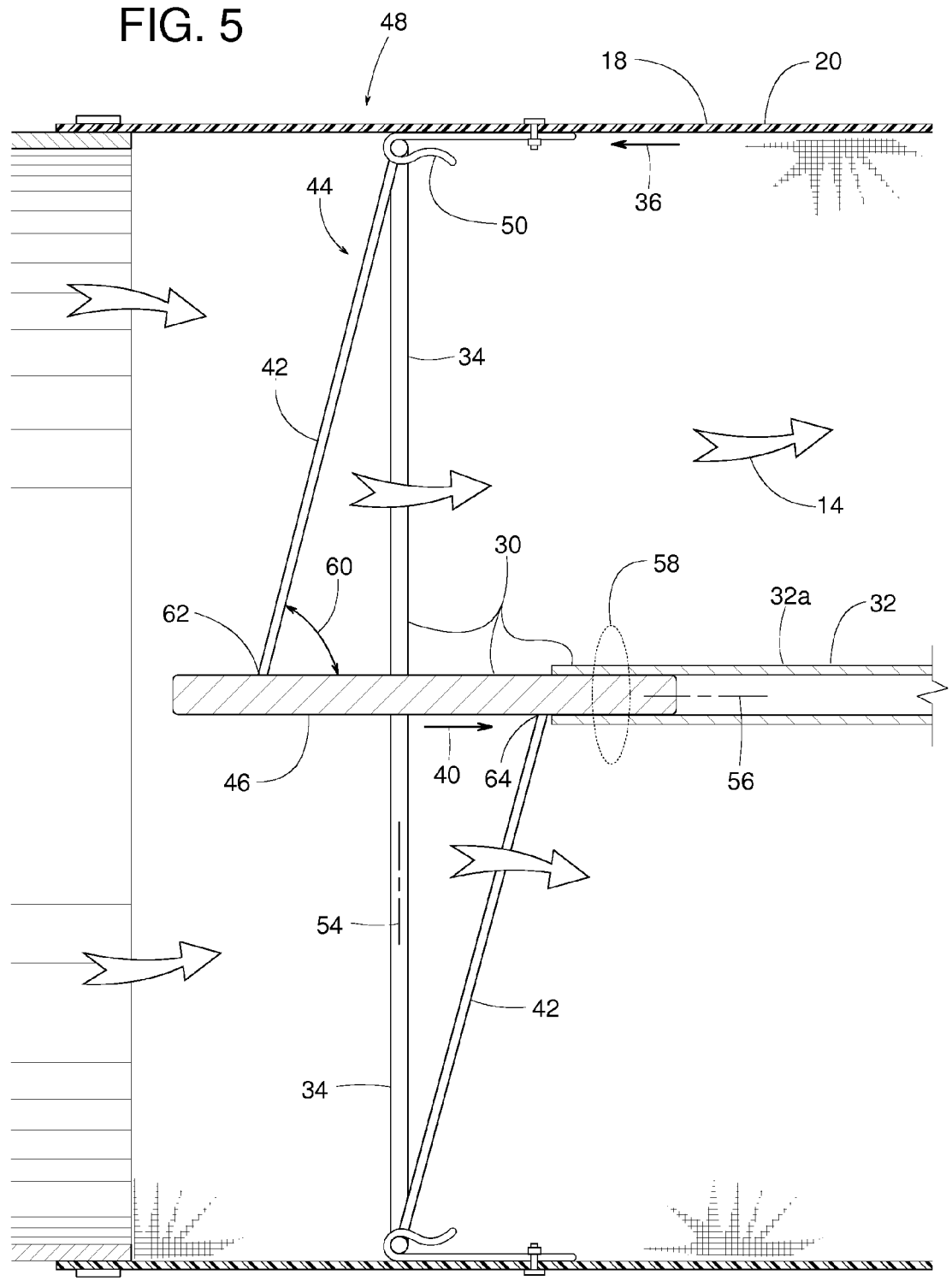
FIG. 5 is a cross-sectional side view showing a portion of the framework in FIG. 2.

Although the framework's 30 specific design details and means for mounting within a pliable air duct may vary, some examples are illustrated in the referenced figures. In FIG. 5, for example, framework 30 includes a radial support member 44 comprising a plurality of spokes 42 that connect rib 34 to a hub 46. In this example, rib 34 is a complete 360-degree ring, but in other examples, rib 34 is a curved rod that extends less than 360-degrees around the inner diameter of duct 18. Also in this example, rib 34, spokes 42 and hub 46, which make up radial support member 44 in this case, comprise a single construction or fabricated member such as a weldment.

Radial support member 44 can be installed at various locations along the length of shaft 32, as shown in FIG. 1. When radial support member 44 is installed at one end 48 of duct 18, as shown in FIG. 5, a retainer 50 holds rib 34 substantially fixed relative to the adjacent sidewall 20 of duct 18 so that this particular radial support member 44 can resist compressive force 40 and transmit the corresponding reactive force as tensile force 36, which tensions sidewall 20. Retainer 50 can be any means for holding a rib or radial support member generally fixed relative to an adjacent sidewall of a duct. Examples of such a retainer include, but are not limited to, a clip (rigid or spring loaded), a strap (elastic or rigid), an axial brace between rib 34 and the blower's housing, a constricting band-style hose clamp (e.g., retainer 52 of FIGS. 3, 4, 17 and 22-24), a screw, rivet, fastener, etc.

In examples where retainer 50 is in the form of an elastic strap or spring loaded clip, the retainer's 50 elasticity can help compensate for permanent longitudinal stretching of duct 18, which may slowly occur over time, depending on the material of sidewall 20. In addition or alternatively, elastic compensation of permanent longitudinal duct stretching may be incorporated within the framework 30 itself at almost any other location along the length of framework 30.

When radial support member 44 is installed at various intermediate locations within the length of duct 18, retainer 50 at those locations may be omitted. Without retainer 50, rib 34, or actually an imaginary plane 54 defined by rib 34, can still be maintained substantially perpendicular to a longitudinal centerline 56 of duct 18 by spokes 42 connecting rib 34 to hub 46 in combination with a telescopic connection 58 (or comparably stiff connection) between hub 46 and an adjoining shaft segment 32a. Shaft segment 32a is one of a plurality of segments that when connected to a plurality of hubs 46 provide an assembled shaft (shaft 32) that lies generally along centerline 56. The rib's 34 perpendicular orientation within duct 18 is further ensured by virtue of spokes 42 being tilted (e.g., spokes 42 lie at an angle 60 not perpendicular to the shaft 32) as shown in FIG. 5. Such an arrangement creates an axially offset arrangement where spokes 42 connect to hub 46 (e.g., spokes 42 are attached to hub 46 at a plurality of points 62 and 64 that are distributed and spaced apart lengthwise along hub 46), thereby making spokes 42 an effective angled brace.

Figure 21:
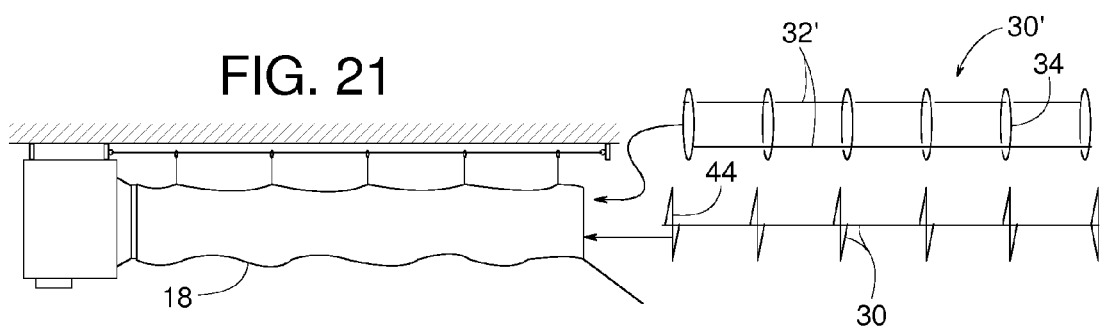
FIG. 21 is a side view similar to FIG. 20 but showing a choice of two example frameworks about to be inserted into the air duct of FIG. 20.

In the example shown in FIG. 5, hub 46 is a solid rod and shaft segment 32a is a tube with the rod fitting telescopically within the tube. In other examples, hub 46 is a tube and shaft segment 32a is a solid rod, wherein the solid rod of the shaft segment fits telescopically within the tubular hub. In some examples, both the hub and the shaft segment are tubes of different diameters with the smaller diameter tube fitting telescopically within the larger one. In some examples, hubs 46 provide a coupling that interconnects a plurality of shaft segments 32a, and in other examples, the hub and the "shaft segments" are a unitary piece or a single weldment. In other examples, the hub and shaft segments are joined by some other means for attachment. In still other examples, as shown in FIG. 21, a framework 30' comprises ribs 34 being interconnected by one or more shafts 32' at the rib's periphery, thereby eliminating the need for spokes 42 and hub 46.

Figure 6:
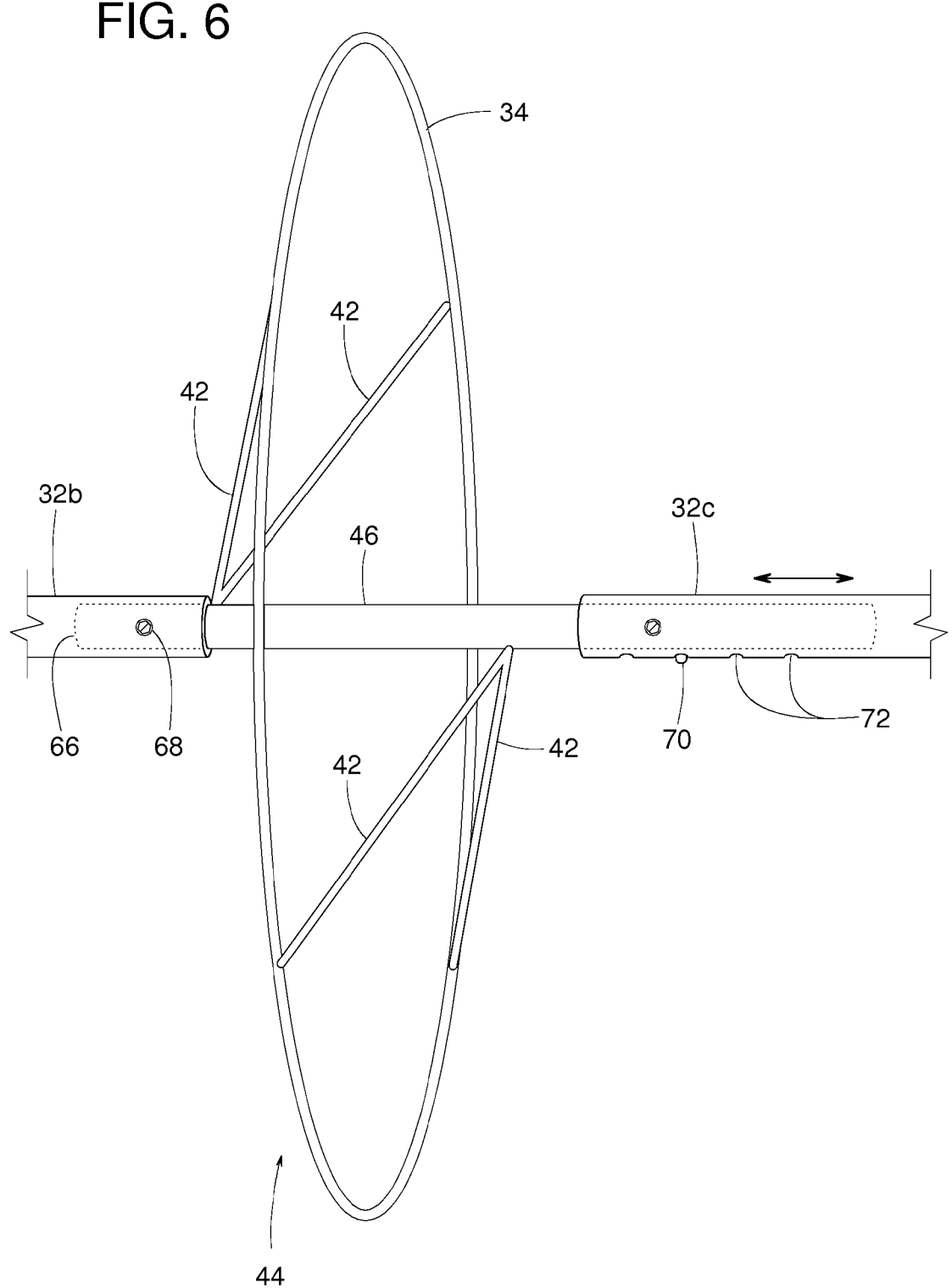
FIG. 6 is a perspective view of an example radial support member.

FIG. 6 shows an example where one end 66 of hub 46 fits within a shaft segment 32b with a fastener 68 (e.g., a screw, pin, spring loaded button, etc.) holding the two together. In addition or alternatively, hub 46 includes a spring loaded button 70 that protrudes selectively into one of several holes 72 in a shaft segment 32c to provide discrete axial adjustment between hub 46 and shaft segment 32c. Such axial adjustment can be used for adjusting the overall length of framework 30.

Figure 7:
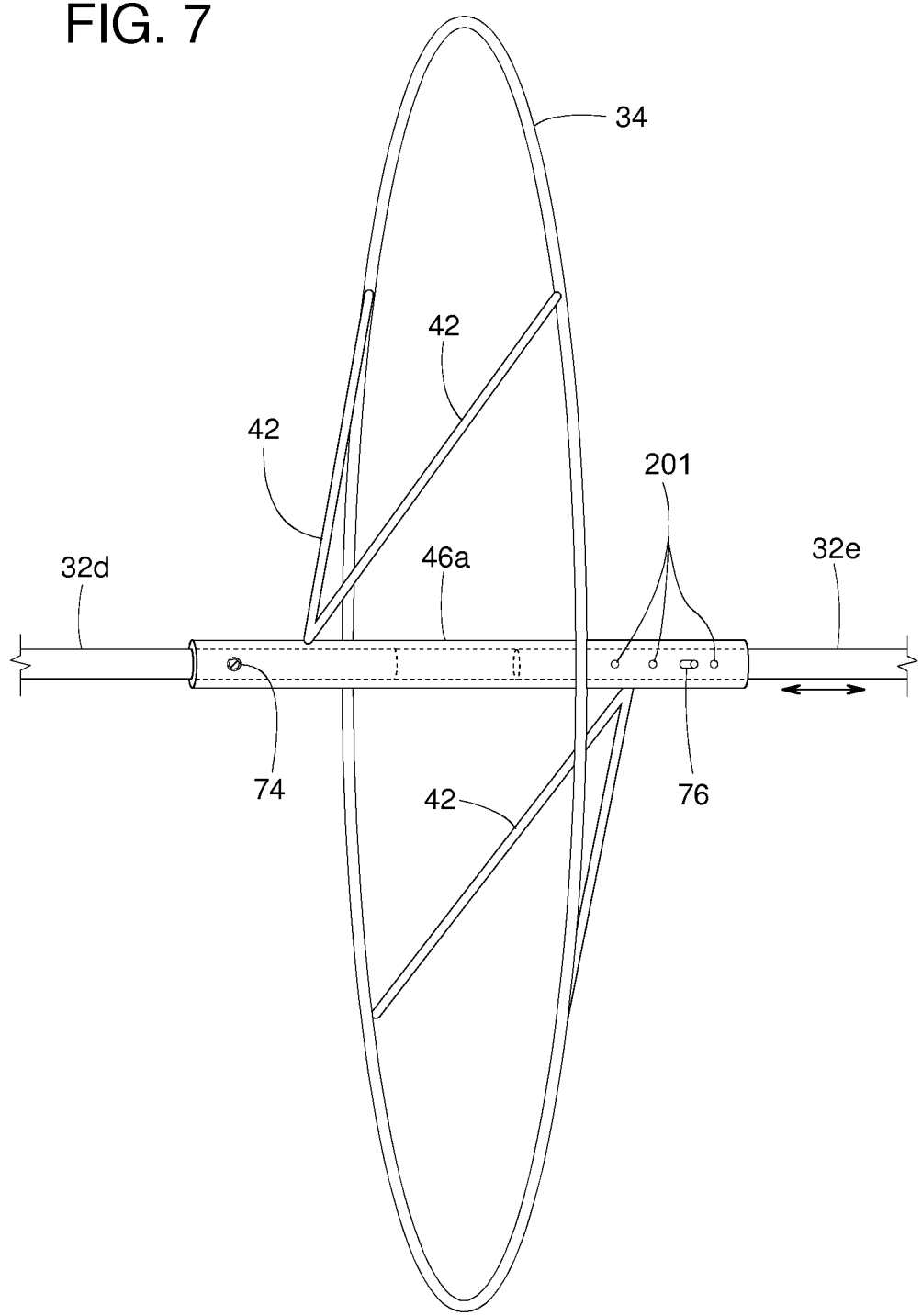
FIG. 7 is a perspective view of another example radial support member.

FIG. 7 shows an example where solid shaft segments 32d and 32e fit within a tubular hub 46a. A self-tapping screw 74 fastens shaft segment 32d to one end of hub 46a. To provide the framework with an adjustable length, a pin 76 is inserted selectively in one of a series of holes 201. Once inserted, pin 76 holds the chosen fixed axial relationship between hub 46a and shaft segment 32e.

Figure 8:
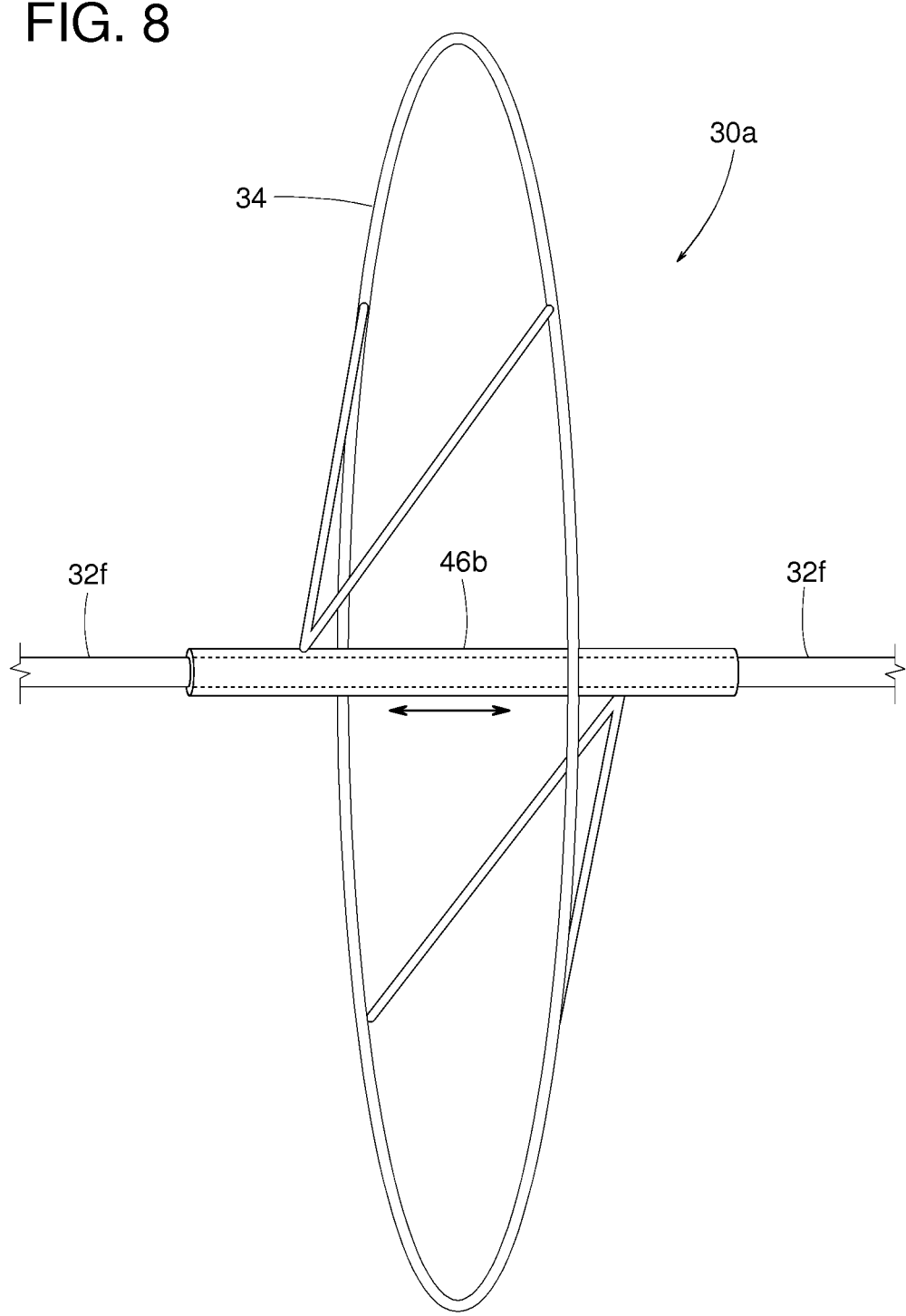
FIG. 8 is a perspective view of another example radial support member.

FIG. 8 shows an example where a radial support member 30a has a tubular hub 46b that can telescopically slide along a continuous shaft 32f, rather than a segmented one. When inserted within duct 18, in some examples, rib 34 is attached to sidewall 20 and hub 46b is left with limited freedom to slide relative to shaft 32f, but in other examples, hub 46b is fastened to shaft 32f to hold it in place axially along shaft 32f.

Figure 9:
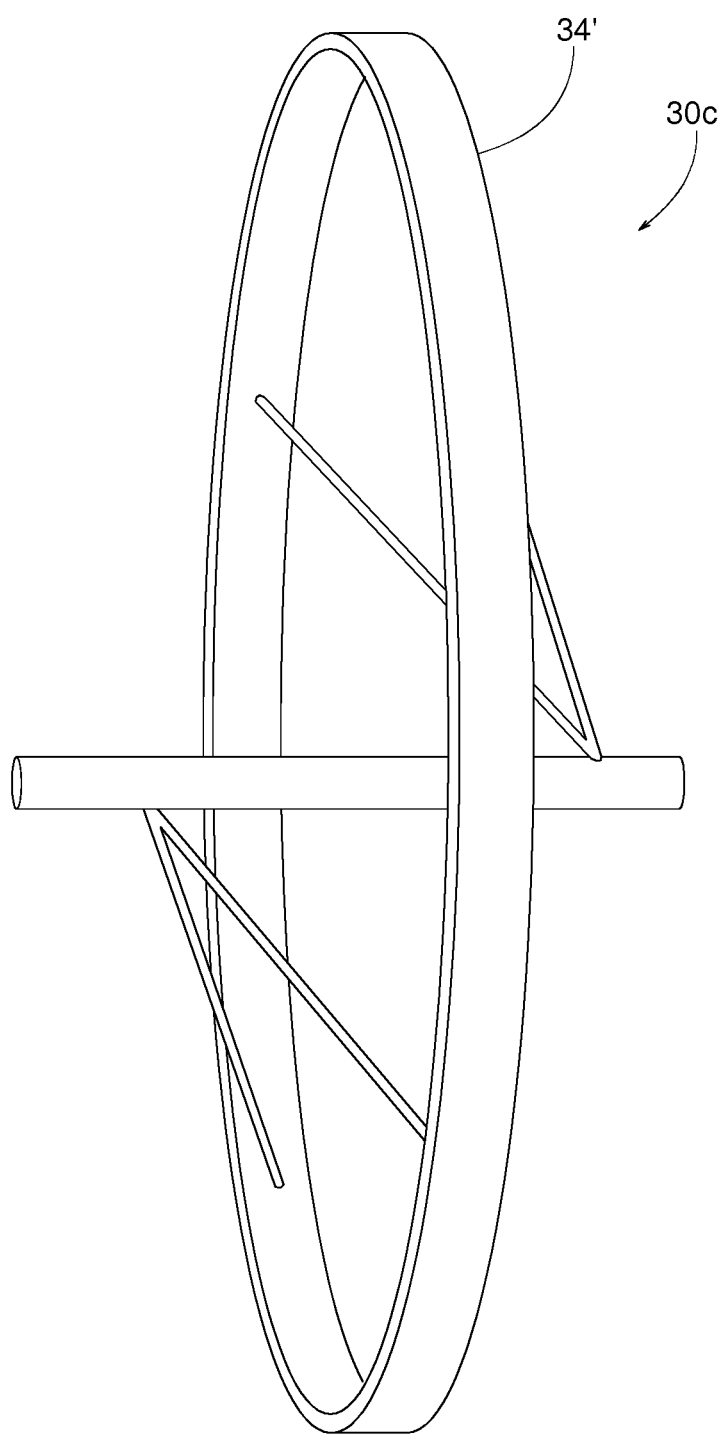
FIG. 9 is a perspective view of yet another example radial support member.

FIG. 9 shows an example where a radial support member 30c includes a ring 34' that may be formed from a flat bar, which might make radial support member 30c more suitable for clamping with a band-style hose clamp such as retainer 52 of FIGS. 3, 4, 17 and 22-24.

Figure 10:
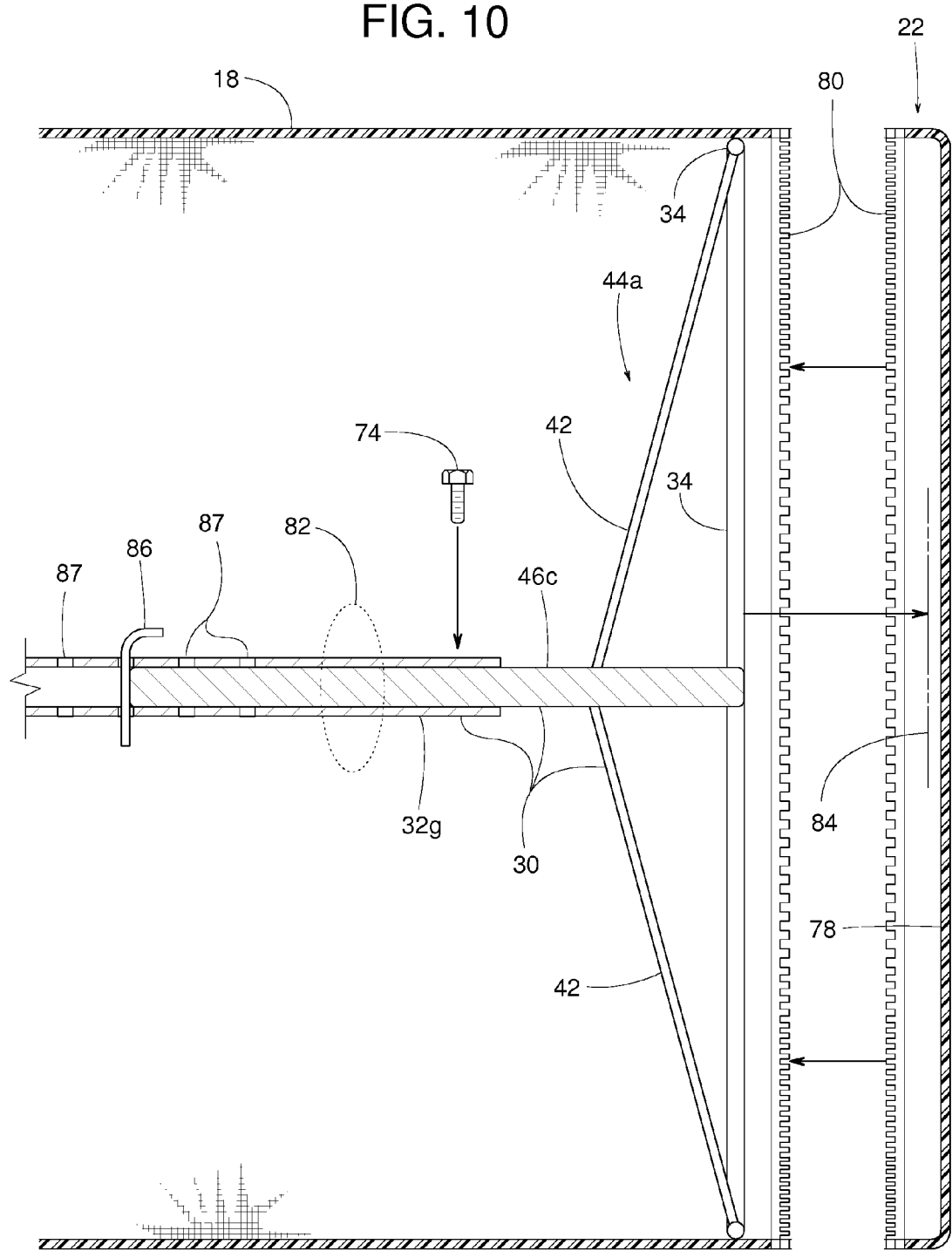
FIG. 10 is a cross-sectional side view showing one end of the framework in FIGS. 1-4 with the end cap disconnected.
Figure 11:
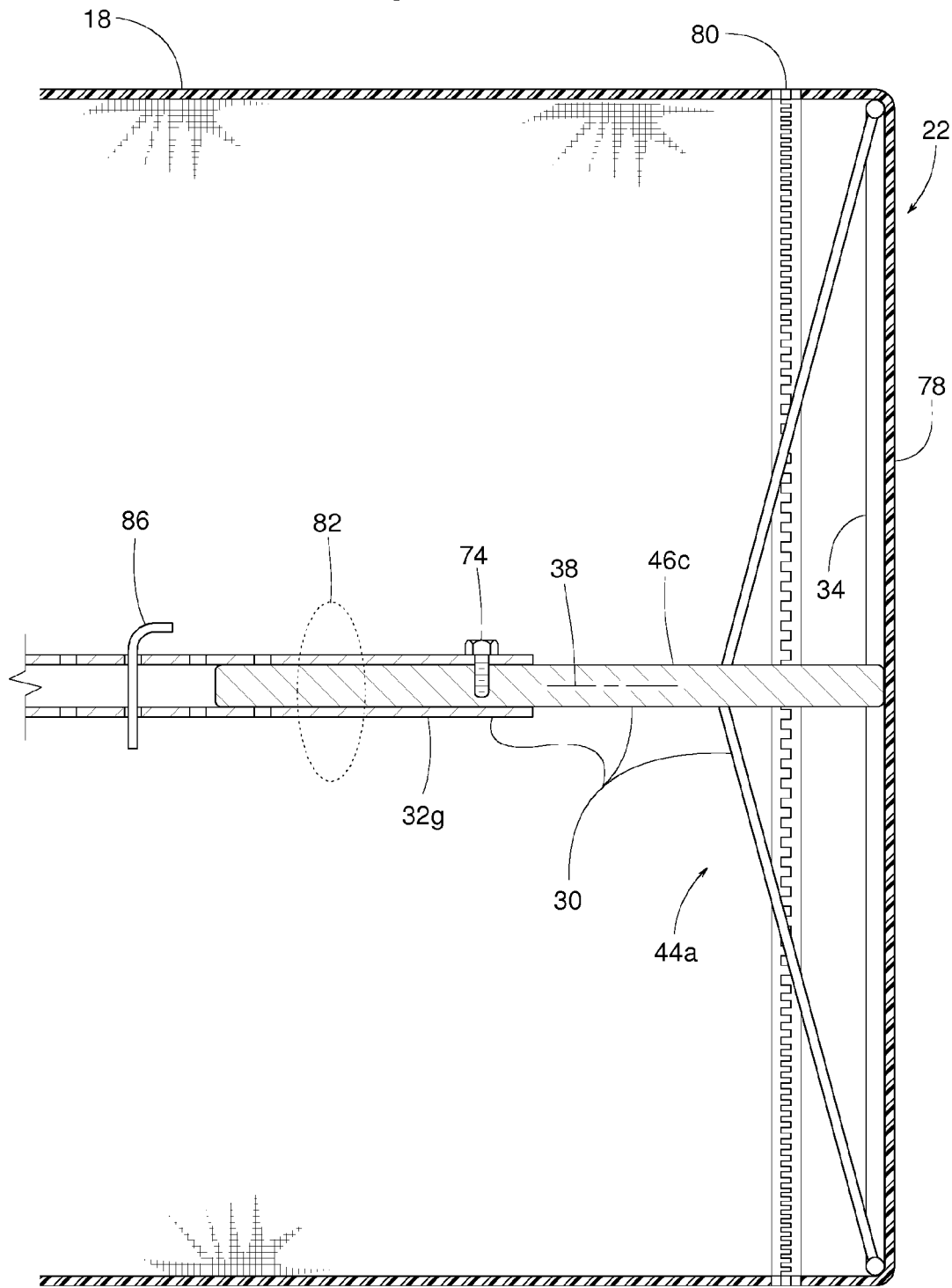
FIG. 11 is a cross-sectional side view similar to FIG. 10 but showing the framework lengthened and the end cap installed.
Figure 12:
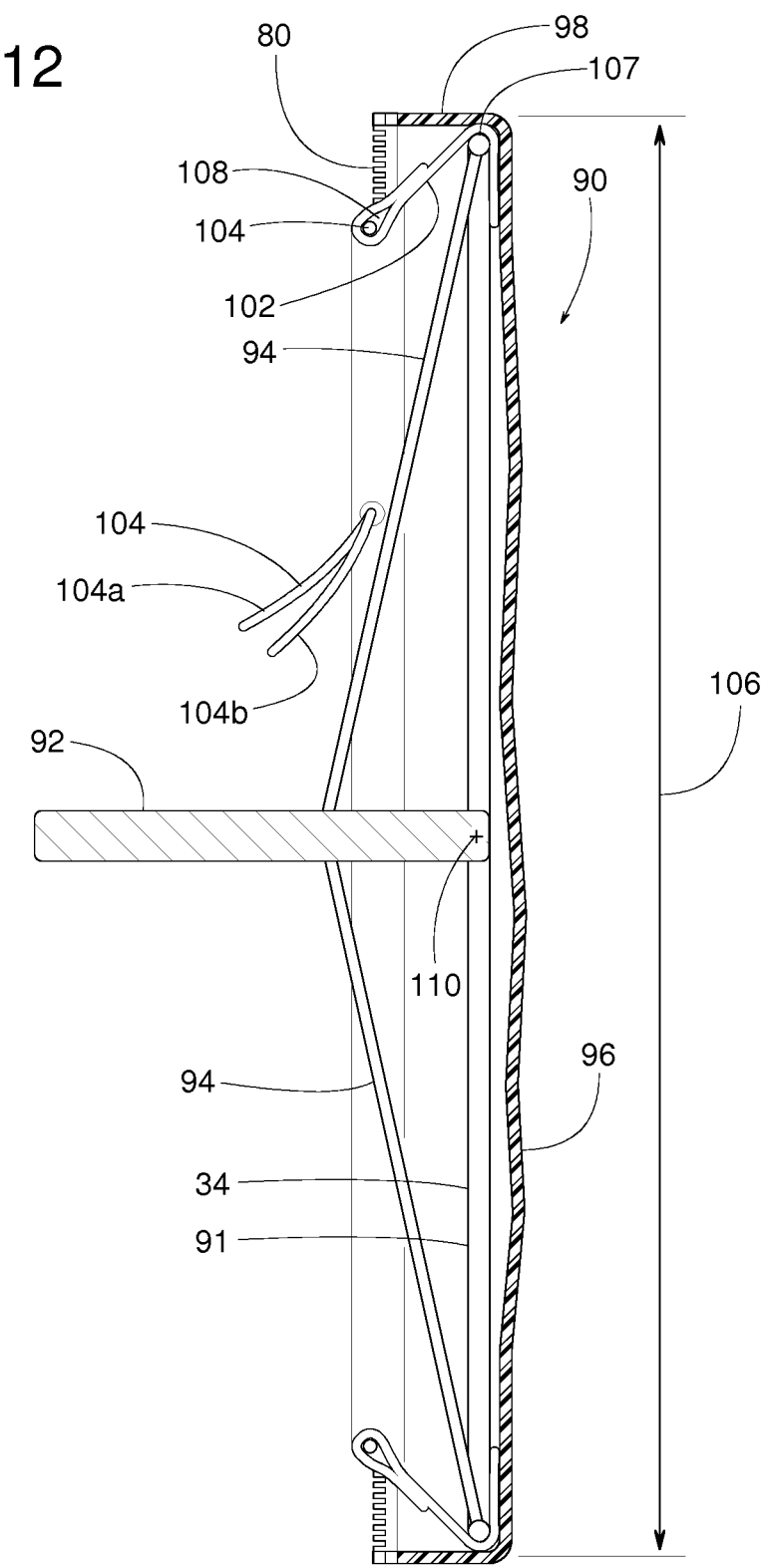
FIG. 12 is a cross-sectional side view of an example end cap.
Figure 13:
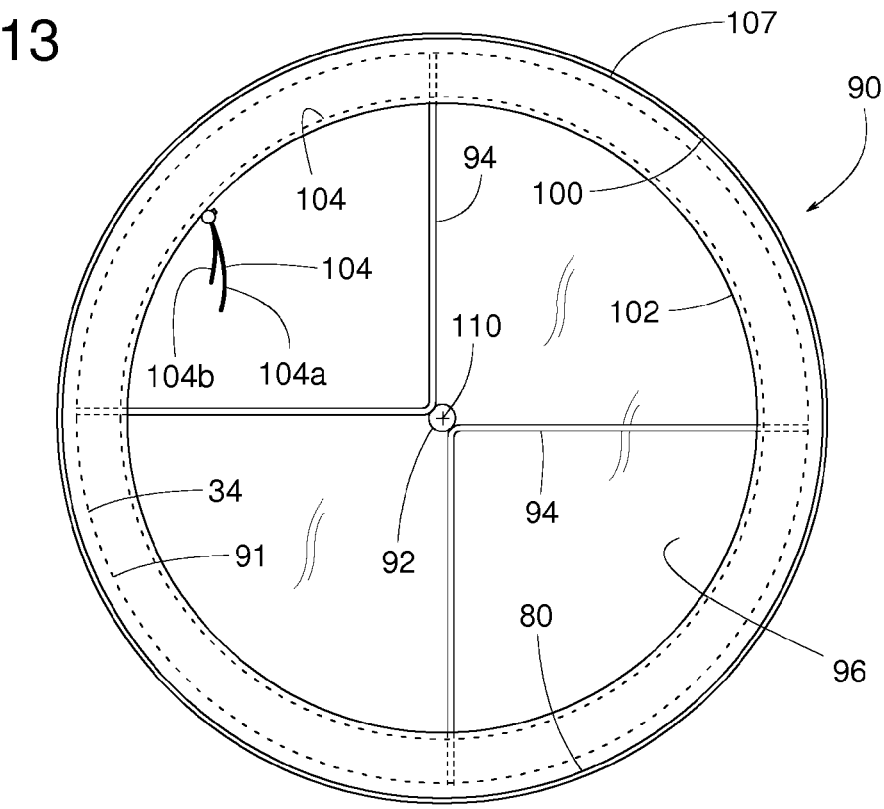
FIG. 13 is a back view of the end cap shown in FIG. 12 with the end cap's pliable sheet being relatively loose.
Figure 14:
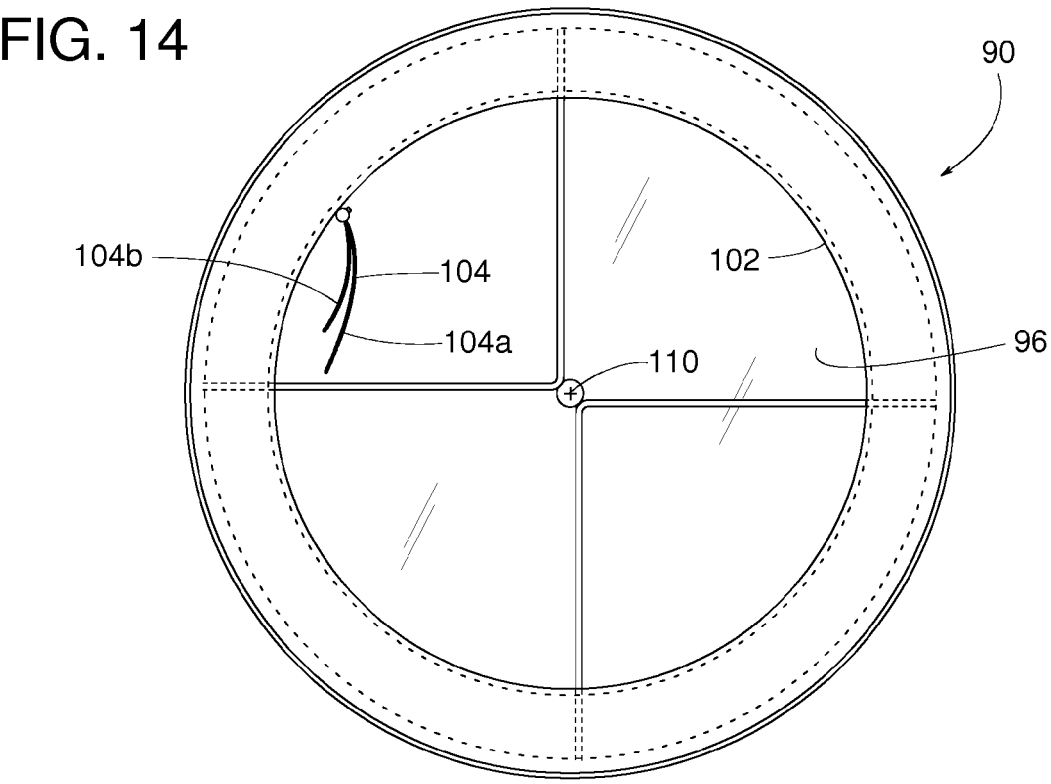
FIG. 14 is a back view similar to FIG. 13 but showing the end cap's pliable sheet taut.
Figure 15:
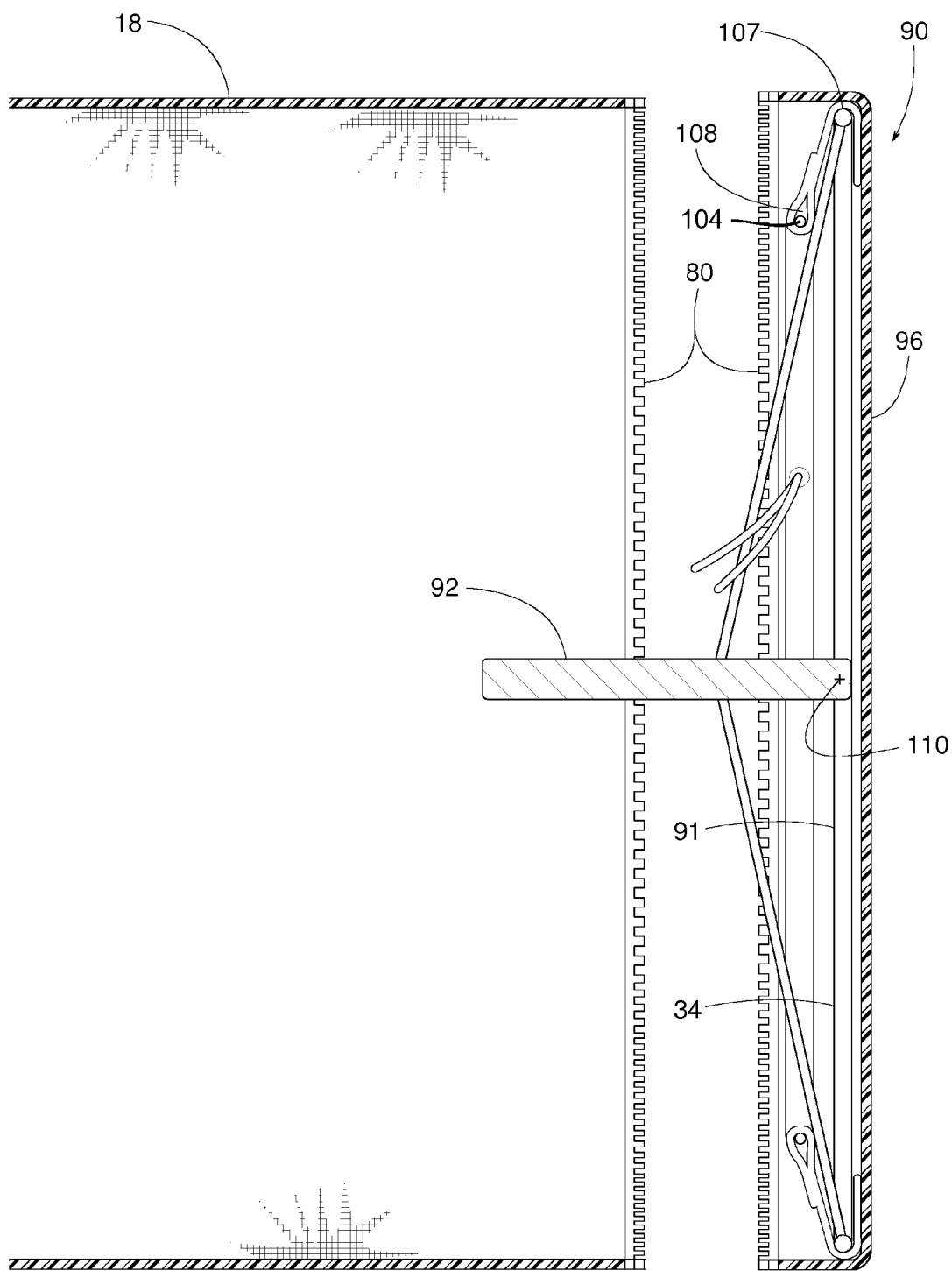
FIG. 15 is a cross-sectional side view similar to FIG. 12 but showing the end cap about to be installed.

In the illustrated example shown in FIGS. 10 and 11, end cap 22 comprises a pliable end sheet 78 with a fastener 80 for connecting end cap 22 to the end of duct 18. Radial support member 44a comprises a plurality of spokes 42 connecting rib 34 to a hub 46c. Some examples of fastener 80 include, but are not limited to, a zipper, a touch-and-hold fastener, snaps, clips, etc. To ensure framework 30 is sufficiently long to tension duct 18 when end cap 22 is installed, a telescopic connection 82 between hub 46c and a shaft segment 32g enables a total length of framework 30 to be increased adequately by sliding radial support member 44a out to phantom line 84, as shown in FIG. 10. When framework 30 is adjusted to the proper length, that length is held fixed by fastening hub 46c to shaft segment 32g by way of screw 74, for instance. In addition or alternatively, a pin 86 selectively insertable in one of a series of holes 87 can be used for setting a minimum length of framework 30, which can be a helpful feature during installation of duct system 10.

After framework 30 is set at the proper length, duct 18 and its end cap 22 are forcibly pulled together over rib 34 and fastener 80 is closed, as shown in FIG. 11. In some examples, the proper length of framework 30 is determined based on the anticipated pressure of air 14 that blower 16 discharges into duct 18. In some examples, the length of framework 30 is sized such that the mechanical force exerted by framework 30 in longitudinal direction 38 is greater than the pneumatic force applied to the duct's end cap 22 so that the application of the pneumatic force does not expand or "pop" duct 18 beyond the end of framework 30. In other words, air duct 18 is at a first magnitude of tension in longitudinal direction 38 when the air inside air duct 18 is at the inactive ambient air pressure, air duct 18 is at a second magnitude of tension in longitudinal direction 38 when the air inside duct 18 is at the active positive air pressure, and the first magnitude of tension is greater than a difference between the first and second magnitudes of tension. Also, the first magnitude of tension is less than the second magnitude of tension. Furthermore, framework 30 is at a first magnitude of compression in longitudinal direction 38 when the air inside duct 18 is at the inactive ambient air pressure, framework 30 is at a second magnitude of compression in longitudinal direction 38 when the air inside duct 18 is at the active positive air pressure, and the first magnitude of compression is greater than a difference between the first and second magnitudes of compression. Also, the first magnitude of compression is greater than the second magnitude of compression.

Figure 3:
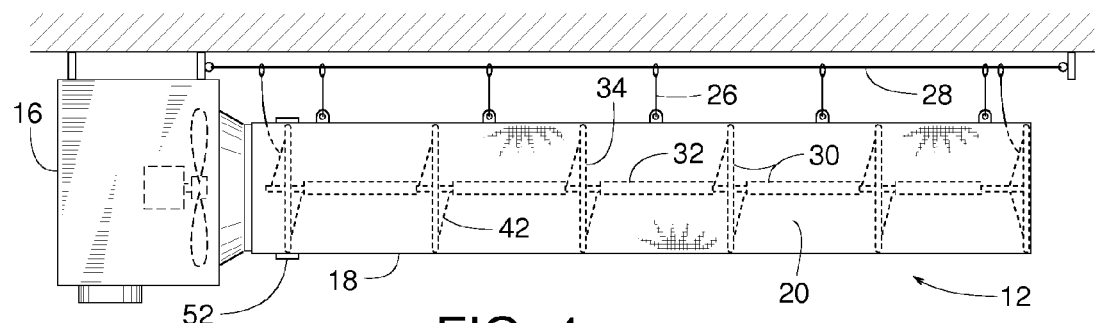
FIG. 3 is a side view similar to FIG. 1 but showing another example air duct system.
Figure 4:
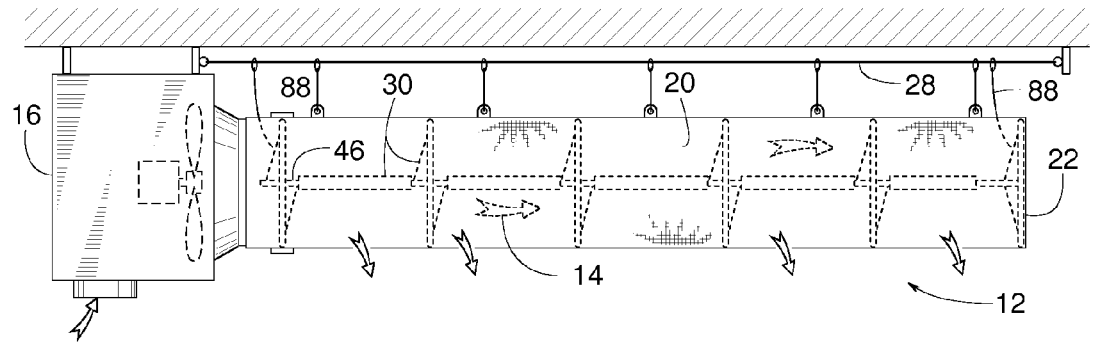
FIG. 4 is a side view similar to FIG. 3 but showing the system blower energized.

Once contained within duct 18, framework 30 requires no additional support because duct 18, which may be independently suspended from overhead support structure 28, carries most if not all the framework's total weight. In some examples, however, as shown in FIGS. 3 and 4, backup hangers 88 extending through sidewall 20 fasten framework 30 directly to some overhead support (e.g., support structure 28) so that framework 30 has a redundant source of support if frame support provided by duct 18 fails.

FIGS. 12-16 show an example end cap 90 that can be used instead of end cap 22 and can be used in a wide variety of pliable or inflatable air ducts, regardless of whether or not the air duct has any other internal framework. End cap 90, in this example, comprises an end piece 91 over which a pliable sheet 96 is stretched or tightly held. In the illustrated example, end piece 91 is provided by rib 34 with an optional hub 92 and optional set of spokes 94. Hub 92 and spokes 94 can be useful when end cap 90 is used in conjunction with a framework, such as the frameworks shown in FIGS. 1-11. Moreover, while the example shown here uses rib 34, any member with a complementary shape to end cap 22 can be used. In the case of a round duct, such a complementary shape would be circular. Accordingly, in addition to a ring, a circular plate or similar structure could also be used. It may not even be necessary for the structure to be continuous circumferentially.

In some examples, end cap 90 also includes a hem 98, fastener 80, an extension 102, and a constricting member 104. Sheet 96 with hem 98 has an outer peripheral portion 106 and overlies an outer periphery 107 of rib 34. In some examples, hem 98 is sewn to the outer peripheral portion of sheet 96. In other examples, hem 98 is an integral extension of sheet 96. Fastener 80 is illustrated to represent any means for connecting hem 98 to the end of a tubular pliable air duct, such as duct 18. In some examples, extension 102 extends from a virtual circular line 100 (FIG. 13) at the general vicinity where both hem 98 meets sheet 96 and where sheet 96 overlies rib 34.

In this example, constricting member 104 is connected to extension 102 and is used for tightening sheet 96 in an outward radial direction, thereby avoiding a loose-fitting appearance of sheet 96. In some examples, constricting member 104 is a drawstring and extension 102 is a circular web having an inner sleeve 108 through which the drawstring (member 104) is threaded. In other examples, extension 102 comprises a plurality of fabric tabs circumferentially spaced apart and distributed along circular line 100. In either case, manually pulling the ends 104a and 104b of the drawstring pulls extension 102 radially inward toward a central point 110 of rib 34, thereby tightening sheet 96 in a radially outward direction. The drawstring is then tied, clamped or otherwise fixed to maintain sheet 96 in a taut state.

Figure 16:
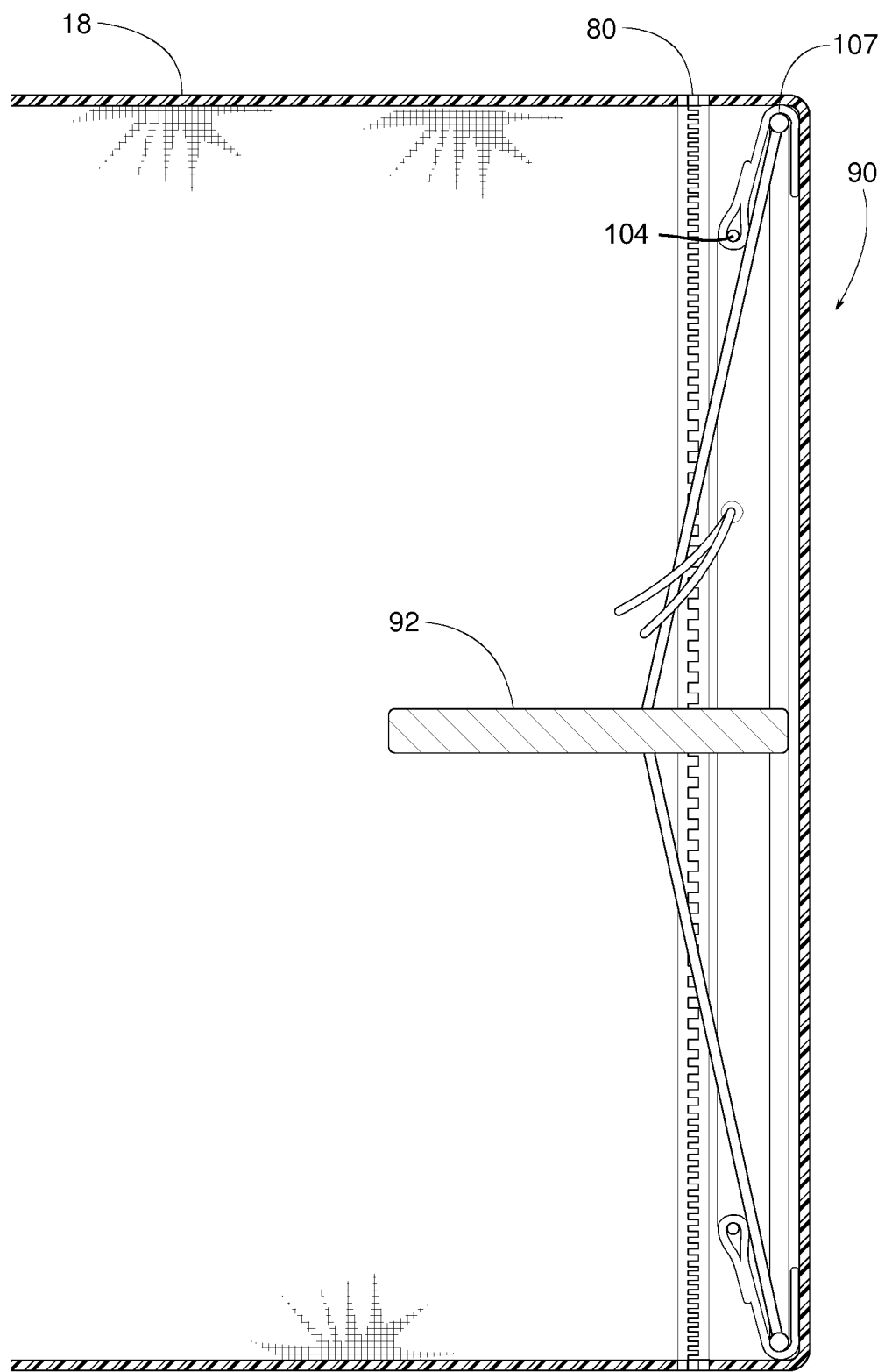
FIG. 16 is a cross-sectional side view similar to FIG. 15 but showing the end cap attached to a pliable-wall air duct.

In more general terms, constricting member 104 has a tight state (FIGS. 14, 15 and 16) and a loose state (FIGS. 12 and 13), wherein pliable sheet 96 is more taut when constricting member 104 is in the tight state than when constricting member 104 is in the loose state, and extension 102 is closer to central point 110 when constricting member 104 is in the tight state than when constricting member 104 is in the loose state. After sheet 96 is taut, fastener 80 connects end cap 90 to tubular pliable air duct 18, as shown in FIG. 16.

Regardless of the shape and other design features of end piece 91, constricting member 104 pulling extension 102 radially inward toward central point 110 pulls pliable sheet 96 over outer periphery 107 of end piece 91 and pulls pliable sheet 96 radially outward. The resulting radial tension in pliable sheet 96 provides end cap 90 with a neat appearance with minimal, if any, wrinkles.

Figure 17:
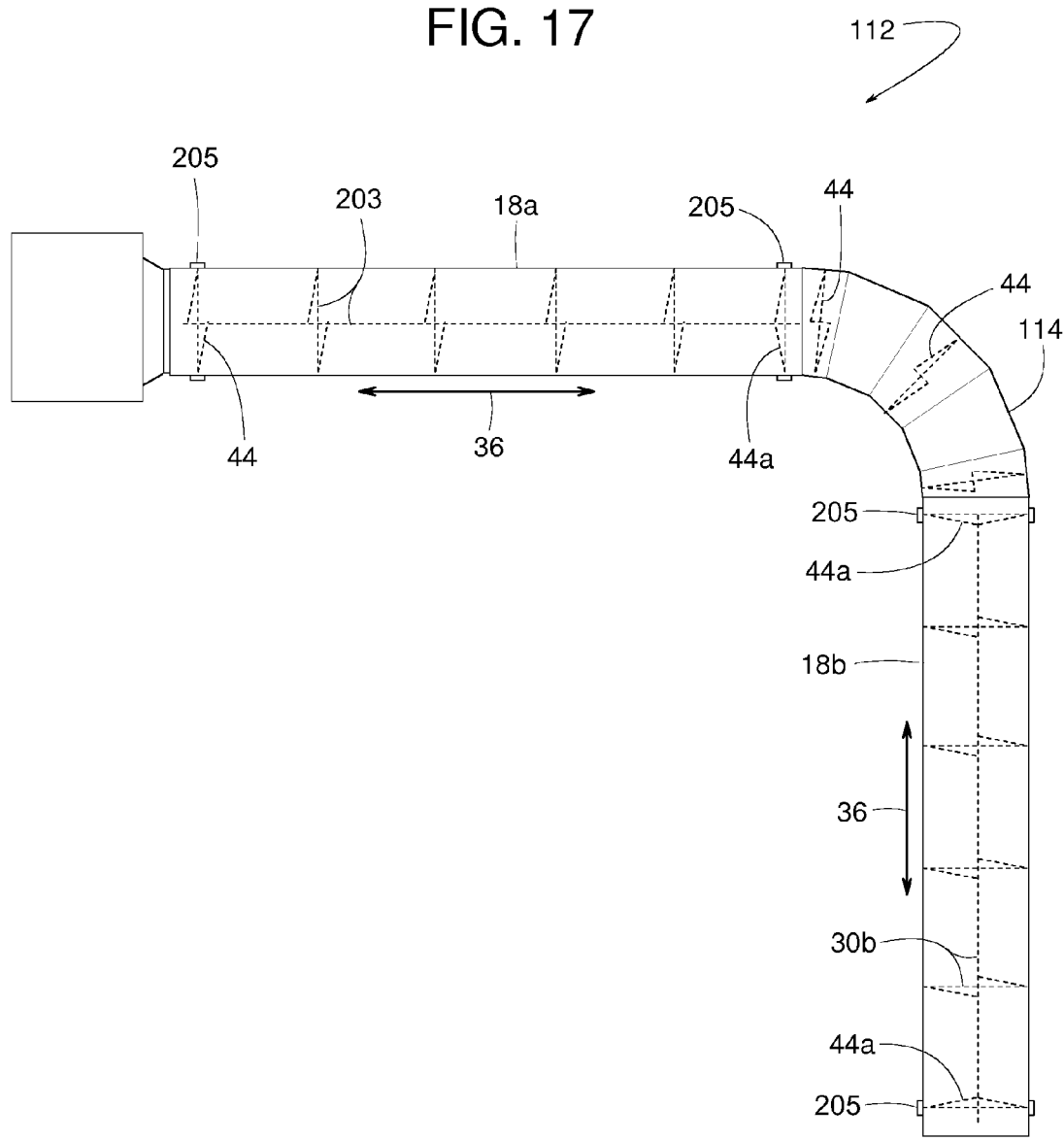
FIG. 17 is a top view of an example air duct system in an L-configuration.
Figure 18:
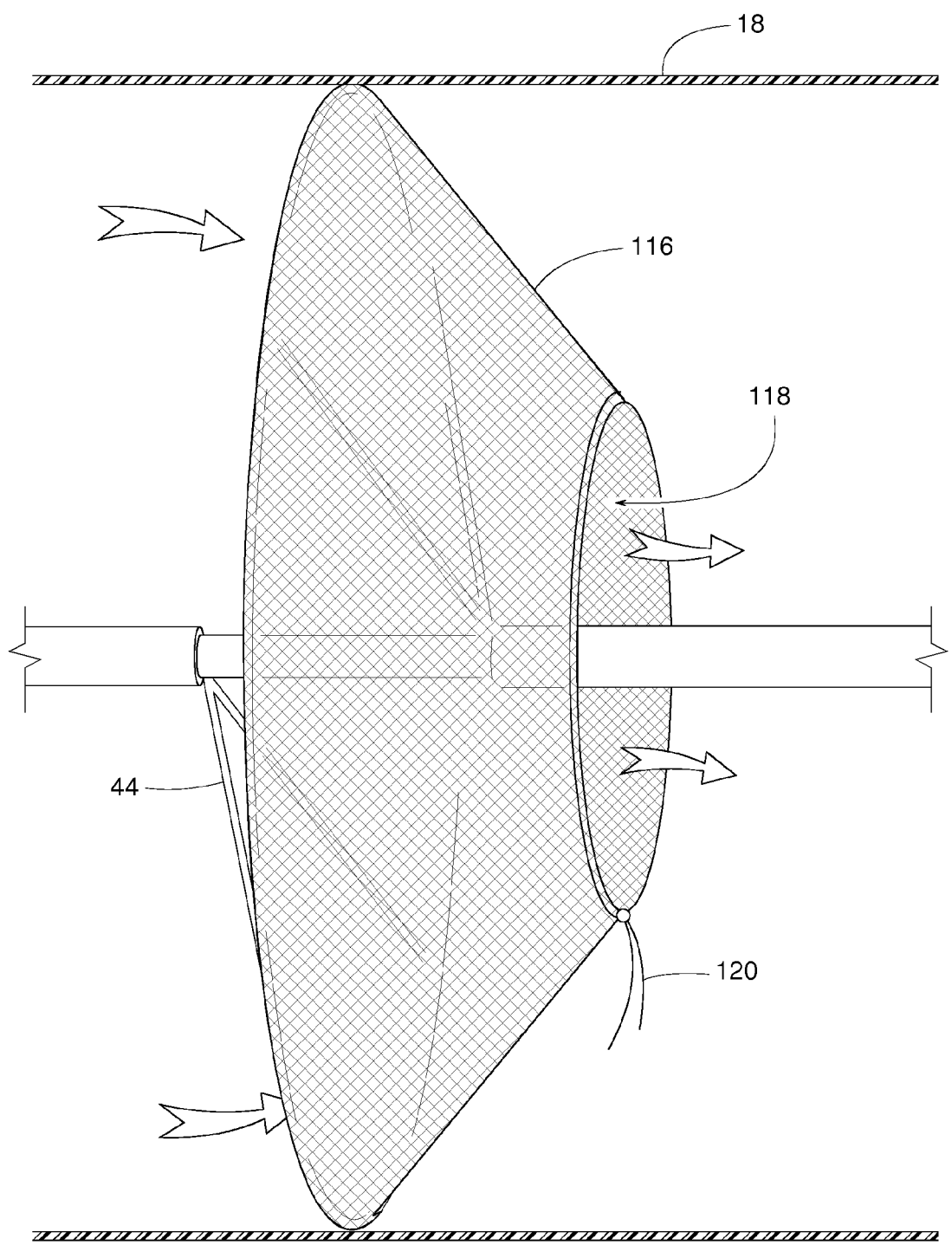
FIG. 18 is a cross-sectional perspective view of an example flow restrictor attached to an example radial support member inside a pliable air duct.
Figure 19:
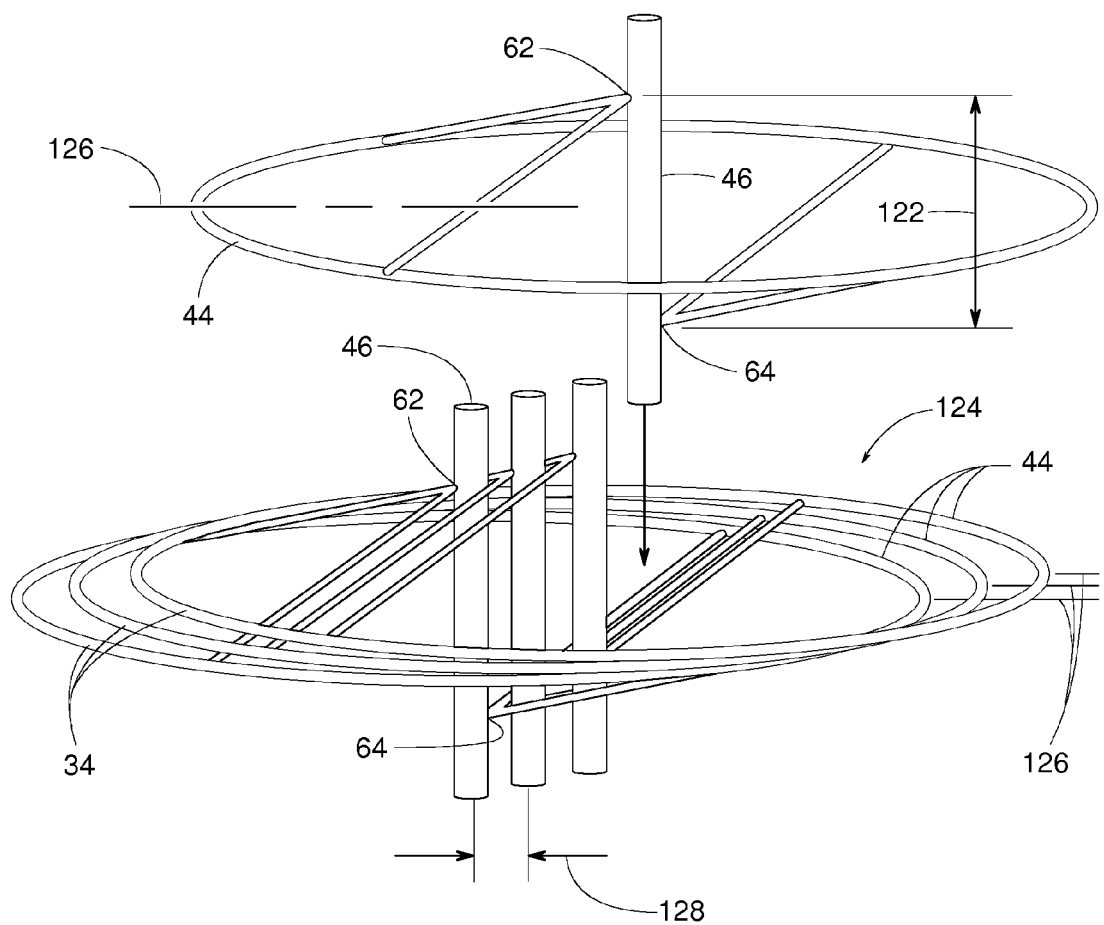
FIG. 19 is a perspective view showing the assembly of a nested stack of example radial support members.

Various additional features and benefits of the aforementioned examples are illustrated in FIGS. 17-19. FIG. 17 is a top view of an example L-shaped air duct system 112 comprising a pliable elbow duct 114 connecting two pliable air ducts 18*a* and 18*b*. To keep substantially the entire L-shaped duct appearing inflated, a first framework 203 is disposed within duct 18*a* to create longitudinal tension and/or tensile force 36 in that duct, wherein radial support members 44 and 44*a* are circumferentially clamped or otherwise held to duct 18*a* by any suitable means including, but not limited to, strap clamps 205 In addition or as an alternative to strap clamp 205 in some examples, a short pliable air duct segment with one or more retainers 50 holds radial support members 44 and/or 44*a* in place while circumferential zippers at either end of the duct segment connects the duct segment to the rest of air duct 18*a*. Likewise, a second framework 30*b* is disposed within duct 18*b* to create longitudinal tension or tensile force 36 in that duct, wherein one or more radial support members 44 are circumferentially clamped to duct 18*b* by any suitable means including, but not limited to, strap clamps 205. One or more radial support members 44 are disposed within elbow 114 to keep elbow 114 appearing generally inflated. In some examples, a curved shaft interconnecting radial support members 44 within elbow 114 helps hold radial support members 44 in place. The curved shaft is not shown because not all examples of an elbow with radial support members include such a shaft.

FIG. 18 shows an example flow restrictor 116 attached to radial support member 44. Flow restrictor 116, in some examples, is a fabric cone with a reduced airflow outlet 118. In some examples, outlet 118 is a fixed opening, and in other examples the downstream opening of outlet 118 is adjustable by way of a constricting drawstring 120.

FIG. 19 shows how a plurality of radial support members 44 can be stacked in a compact transportable arrangement. Such a nested arrangement is possible due to the offset between spoke connecting points 62 and 64, wherein points 62 and 64 are longitudinally offset (dimension 122) and are on opposite sides of hub 46. In more specific terms, the example illustrated apparatus/assembly 124 comprises a plurality of ribs 34, wherein each ring 34 lies along an imaginary plane 126 to define a plurality of imaginary planes 126. Apparatus/assembly 124 also includes a hub 46 attached to each rib 34 to create a plurality of hubs 46. Rings 34 are in a transportable stacked arrangement with rings 34 lying adjacent each other so that the plurality of imaginary planes 126 are substantially parallel to each other. The plurality of hubs 46 are radially offset to each other (dimension 128), and the plurality of ribs 34 are radially offset to each other. In the illustrated example, at least one hub 46 extends through more than one imaginary plane 126.

Figure 20:
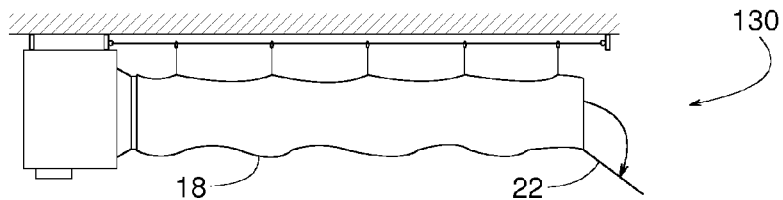
FIG. 20 is a side view of an existing pliable-wall air duct about to be retrofitted with an example framework.
Figure 22:
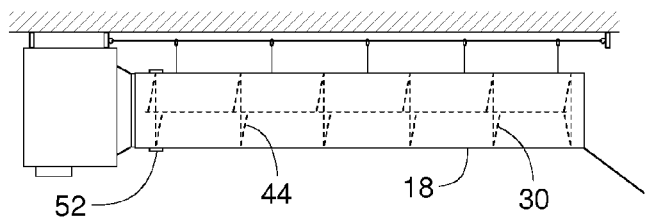
FIG. 22 is a side view similar to FIG. 20 but showing an example framework installed within the duct.
Figure 23:
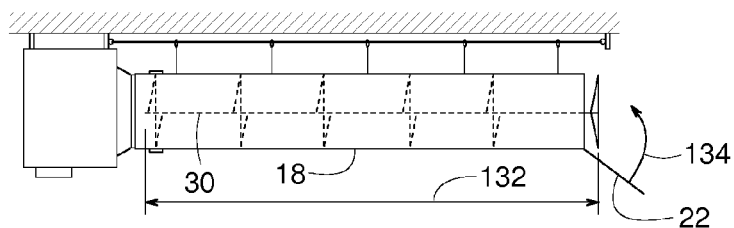
FIG. 23 is a side view similar to FIG. 22 but showing the framework being adjustably lengthened.
Figure 24:
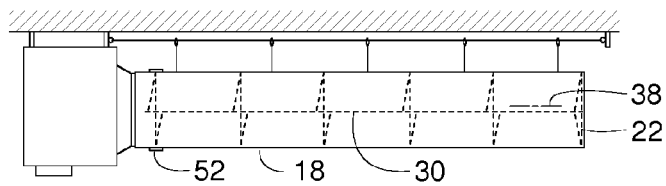
FIG. 24 is a side view similar to FIG. 20 but showing an example framework installed and axially compressed within the duct.

FIGS. 20-24 illustrate an example method for taking an existing, previously functional air duct system 130 that includes an inflatable air duct 18 and retrofitting system 130 with framework 30 or one similar to it. In some examples, the method involves accessing the interior volume of duct 18 by opening the duct at some point, for example, at the duct's end cap 22, as shown in FIG. 20. FIG. 21 shows installing framework 30 inside duct 18. In some examples, alternate styles of frameworks are installed instead, such as framework 30'. In some examples, framework 30 is assembled progressively as it is inserted in duct 18. FIG. 22 shows framework 30 inside duct 18 with example retainer 52 holding one radial support member 44 in place. FIGS. 22 and 23 show how a longitudinal length 132 of framework 30 is adjustable, where framework 30 is longer in FIG. 23 than in FIG. 22. Arrow 134 of FIG. 23 represents closing end cap 22, thereby enclosing framework 30 within the internal volume of duct 18. Forcibly enclosing framework 30 within duct 18, as shown in FIG. 24, results in compressing framework 30 and tensioning inflatable air duct 18 in longitudinal direction 38.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. An air duct system for supporting an air duct, the air duct system comprising:
   a tubular pliable sidewall defining a flow direction along which the air duct system conveys a current of air;
   a ring disposed within the tubular pliable sidewall and lying substantially perpendicular to the flow direction;
   a hub disposed substantially at a center point of the ring, the hub extending lengthwise in the flow direction; and
   a plurality of spokes extending between the ring and the hub, the plurality of spokes being attached to the hub at a plurality of points that are distributed lengthwise along the hub, the air duct being in tension along the flow direction of the air duct.

2. The air duct system of claim 1, further comprising:
   a second ring disposed within the tubular pliable sidewall spaced apart from the ring;
   a second hub disposed substantially at a center point of the second ring; and
   a shaft extending between the hub and the second hub, the shaft to hold the air duct in tension.

3. The air duct system of claim 1, wherein the tubular pliable sidewall forms an elbow duct.

4. An air duct system, comprising:
   a tubular air duct comprising a pliable sidewall;
   a first ring movably coupled to a first shaft, the first ring and the first shaft to be disposed within the air duct, the first ring to be movable relative to the first shaft to place the air duct in tension, the first ring to be fixable with respect to the first shaft and the air duct to hold the air duct in tension by virtue of the first shaft being held in compression; and
   a hub and a spoke, the spoke coupling the hub and the first ring, the hub coupled to the first shaft.

5. The air duct system of claim 4, further comprising a second ring movably coupled to a second shaft, the second ring and the second shaft to be disposed within the air duct, the second ring movable relative to the second shaft to place the air duct in tension, the second ring to be fixable with respect to the second shaft and the air duct to hold the air duct in tension by virtue of the second shaft being held in compression.

6. The air duct system of claim 5, wherein the first ring is spaced from the second ring.

7. The air duct system of claim 5, wherein the first shaft is coupled to the second shaft.

8. An air duct system, comprising:
a tubular air duct comprising a pliable sidewall;
a first ring movably coupled to a first shaft, the first ring and the first shaft to be disposed within the air duct, the first ring to be movable relative to the first shaft to place the air duct in tension, the first ring to be fixable with respect to the first shaft and the air duct to hold the air duct in tension by virtue of the first shaft being held in compression; and
a spoke coupling the first ring and the first shaft.

9. The air duct system of claim 8, wherein the spoke is non-perpendicularly coupled to the first shaft.

10. The air duct system of claim 9, wherein the first ring is coupled to an interior surface of the air duct.

11. The air duct system of claim 10, wherein the coupling between the first ring and the interior surface enables the ring to be resistive to compressive forces.

12. The air duct system of claim 4, wherein the first ring is telescopically coupled to the first shaft.

\* \* \* \* \*

UNITED STATES PATENT AND TRADEMARK OFFICE
CERTIFICATE OF CORRECTION

PATENT NO. : 9,605,865 B2  
APPLICATION NO. : 14/288116  
DATED : March 28, 2017  
INVENTOR(S) : Pinkalla et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 107 days.

Signed and Sealed this  
Twenty-ninth Day of May, 2018

Andrei Iancu  
*Director of the United States Patent and Trademark Office*